March 9, 1954    G. FRIEDRICHS    2,671,874
PROTECTIVE SYSTEM FOR MEASURING INSTRUMENTS
Filed Dec. 23, 1950
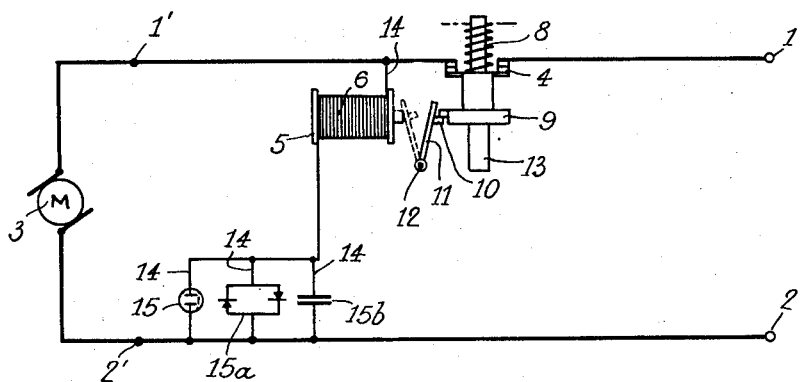
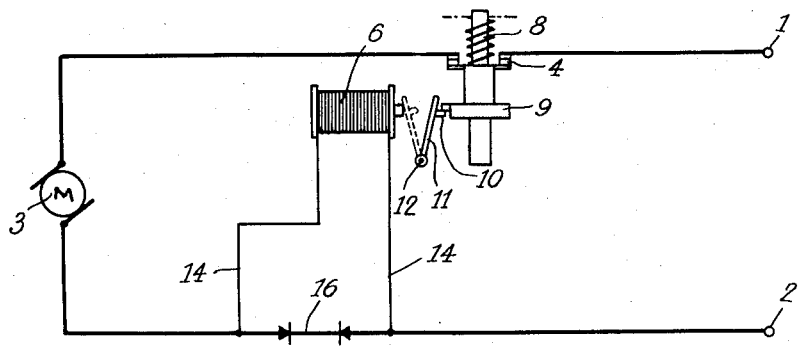
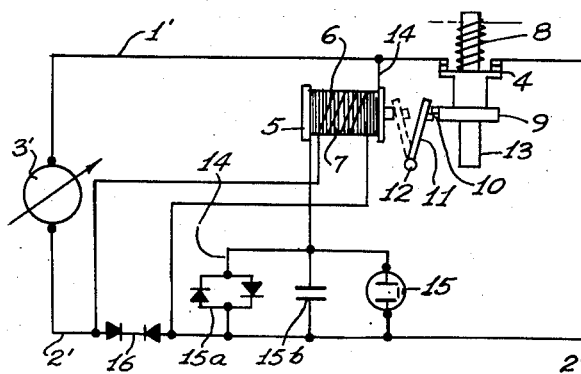
INVENTOR
GEORGES FRIEDRICHS
BY
ATTORNEY Patented Mar. 9, 1954

2,671,874

UNITED STATES PATENT OFFICE 2,671,874

PROTECTIVE SYSTEM FOR MEASURING INSTRUMENTS

Georges Friedrichs, Annecy, France, assignor to Compagnie Generale de Metrologie (Societe a Responsabilite Limitee), Chemin de la Croix Rouge-Annecy, France Application December 23, 1950, Serial No. 202,472

6 Claims. (Cl. 317—60)

1

The majority of electrical measuring instruments as hitherto known, comprises an indicating system including movable elements, such as a pointer or a coil, which are highly fragile, and auxiliary circuits such as shunts and high precision resistors incapable of withstanding without damage overloads substantially higher than their normal load. In particular, instruments of the type having multiple ranges of sensitivity or response are liable, as a result of improper use, to be subjected to overloads so high as to damage practically instantly the movable element of the instrument by mechanical stress, and the circuit connections by the generated heat.

A similar danger exists in the case of high-sensitivity instruments connected in circuits including a source of energy capable of momentarily delivering an intensely high current.

There are also known instruments which are intended for the measurement of direct current and which should under no circumstance be subjected to the flow of alternating potentials of the kind which are sometimes apt to be superimposed over the direct current.

Protective systems are known which are designed to cut off the flow of current when the said current reaches a value high enough to be liable to damage the instrument and in which the controlling or supervisory device (for instance a cut-off relay operated by a predetermined high value of the current) is mounted in series with the circuit which it is to protect. Such devices have the disadvantage that the protecting element is at all time traversed by the full operating current and further that they introduce a substantial resistance into the said circuit. Moreover such devices lack sensitivity.

According to the present invention, the cut-off relay is mounted in a so-called safety circuit separate from the measuring and load circuit proper and which is normally traversed by no or by a negligibly low current. Operation of this safety circuit is controlled by a combination of control means separate from the cut-off relay and selected so as to operate in response to changes of definite predetermined value in the circuit conditions, which changes may differ widely in character. The control means may be mounted in series or in parallel with the main circuit depending on the nature of the changes in the circuit conditions against which it is to afford protection.

Some exemplary embodiments of the invention

2 are illustrated diagrammatically in the accompanying drawings, wherein:

Fig. 1 is a protective network according to the invention for protecting devices sensitive to voltage surges.

Fig. 2 is a protective network for protecting devices sensitive to current surges, and Fig. 3 is a protective network for protecting devices sensitive to voltage and current surges.

The load circuit to be protected is supplied from a source of current 1, 2. The terminals 1' and 2' indicate the points of connection with the load circuit including the apparatus to be protected, shown by way of example as an electric motor 3.

Included in the conductor leading from terminal 1 to terminal 1' is a pair of contacts 4 normally closed and adapted to be opened by a cut-off relay 5 when a current of given magnitude flows through the coil 6 of the relay electromagnet. In the example illustrated, the contacts 4 are biassed by a spring 8 to cut-off position, i. e. the contacts being urged by the spring downwardly as shown in the figure. The contacts 4 are moreover rigidly connected with an arm 9 adapted to be engaged by a catch 10 projecting from an armature 11 rockable about a fixed pivot 12. It is apparent that when current flows through the winding 6, the armature 11 will be attracted to the dotted-line position in which arm 9 is released from the projecting catch 10, whereupon the spring 8 urges the movable contact structure into the open position. A push-button 13 makes it possible to re-close the contacts 4 after normal conditions are restored in the load circuit.

It is to be understood that the specific type of relay illustrated and described is by no means restrictive, and many other equivalent types of relays may be used in the circuit arrangement described.

According to a feature of the invention, the relay winding 6 is connected by a conductor 14 across the main or load circuit. This conductor also includes several coating control means 15, 15a and 15b so selected as to allow no current to flow so long as the voltage in the load circuit is within a safe range but to allow energization of coil 6 when the voltage in the load circuit is above the safe range. The control means 15, 15a, and 15b are shown as including the following devices:

A glow discharge tube 15 with a voltage breakdown characteristic such that it equals the critical voltage for the load circuit that is, the voltage at which the load circuit should be cut off to avoid damage to the device 3 to be protected.

Rectifying means 15a shown as two oppositely connected dry rectifiers. Such rectifiers are in effect variable resistance elements which have a high resistance at low voltage and the resistance of which decreases sharply even for a small increase in voltage. Commercially available dry rectifiers are sufficiently sensitive to energize the relay coil 6 in response to excess voltages in the order of one volt. By reason of the opposite connection of the rectifiers current may flow in either direction thereby making the protective network suitable for alternating current.

As is well known a glow discharge means such as a neon tube has a very fast reaction time but is comparatively insensitive to changes in voltage, on the other hand, dry rectifiers are highly sensitive to changes in voltage but the reaction time of dry rectifiers, that is, the time in which they become operative is comparatively slow. Consequently, the use of dry rectifiers is advantageous as far as sensitivity is concerned but disadvantageous in regard to reaction time, and the use of glow discharge means is desirable in regard to the fast reaction time of such means but less desirable in view of the comparative insensitivity to changes in voltages. By combining a device of high sensitivity and slow reaction time with a device of fast reaction time and lower sensitivity the advantages of both devices are obtained while neutralizing the disadvantages of both devices. As a result, the network according to Fig. 1 is very sensitive to changes in the voltage to be supervised by virtue of the rectifying means and protected against damage by strong voltage surges by the fast reaction time of the glow discharge tube which will cause opening of contacts 4 before the rectifying means can be damaged.

The control means 15b is a capacitor the purpose of which is to protect the device 3 against the accidental connection to a source of alternating current when said device is designed for direct current. As is well known a capacitor blocks the flow of direct current but permits the flow of alternating current. Consequently, no current will flow through the capacitor as long as terminals 1 and 2 are fed with direct current but when the load circuit is connected to a source of alternating current the resulting current flow through the capacitor causes energization of the relay and hence opening of contacts 4. In practice the arrangement is preferably so that the relay is not energized unless the alternating current voltage is above a predetermined level.

The circuit shown in Fig. 2 is designed for the protection of the load circuit with its load apparatus 3 against excess or surge currents. There is included in the load circuit a control means 16 shown as two oppositely arranged dry rectifiers which allows current to flow so long as the current is within a safe range but prevents the flow of current when the current magnitude increases above the safe range. The circuit 14 of the relay winding 6 is in this case connected as shown in parallel with the element 16. It is apparent that so long as the current intensity is normal, the current will flow directly through the control means 16 and that only a negligibly low amount of the total current will be permitted to flow through the coil 6, because of the high resistance of the latter. If on the other hand the current increases beyond a predetermined limit, the resistance of the control means 16 increases and a current of greater magnitude will therefore flow through the coil 6, operating the relay.

It is known that the dry rectifiers forming control means 16 operate practically as resistances which do not follow Ohm's law. Their conductance is varied as a function of the magnitude and direction of the current flowing therethrough. It is therefore possible to cause direct current to flow through an inverted rectifier cell. If this current is increased, the voltage across the resistance will increase at a much faster rate than the current.

It will be seen that in the above-described arrangements, the safety circuit does not normally receive current or is only fed with very low current, and that any anomaly in the load circuit will result in causing said circuit to be traversed by the full value of the current through the load circuit. This increases the difference between the current to which the safety circuit is subjected respectively in normal operation and at the time the safety system has operated, as compared to known systems, wherein the safety circuit is at all times fed with the full current flowing through the load circuit.

It will be understood of course that the invention is not restricted to the two specific forms of embodiment illustrated and described by way of example. Thus in particular, devices similar to each of those shown in Figs. 1 and 2 may be used in combination for protecting a load both against voltage and current surges. Moreover, a smaller or greater number of safety control means such as 15 and 15a may be used in combination depending on the sensitivity of the measuring or other load apparatus.

Fig. 3 shows a circuit diagram which is essentially a combination of the networks according to Figs. 1 and 2. Accordingly, the same reference numerals are used to designate corresponding parts. The device 3' to be protected is indicated in Fig. 3 by a symbol for a measuring instrument. Relay 5 is shown as comprising two coils 6 and 7, coil 6 being controlled by control means 15, 15a and 15b and coil 7 by control means 16.

The function of the circuit system according to Fig. 3 will be apparent from the description of Figs. 1 and 2. It suffices to state that the control means 15 and 15a will protect instrument 3' against voltage surges, capacitor 15b against an accidental connection to a source of alternating current; and control means 16 against current surges.

What I claim is:

1. A protective network for protecting an electric device sensitive to voltage surges in an energizing circuit for the device, the said network comprising electromagnetic switch means including normally closed cut-off switch contacts in said energizing circuit and coil means controlling the opening of said switch contacts, auxiliary circuit means connected to said energizing circuit in parallel with the device to be protected, the said auxiliary circuit means including said coil means and a pair of complementary electric control means connected in parallel with each other and in series with the coil means, each of the said control means substantially blocking a flow of current through the auxiliary circuit means sufficient to actuate the coil means for opening of said switch contacts when the voltage in the energizing circuit is below a predetermined level and becoming electrically conductive for actuating the coil means for the purpose aforesaid in response to a voltage in the energizing circuit above the said predetermined level, the said two control means being different from each other as to sensitivity and reaction time to changes in voltage, the control means with the higher sensitivity having the slower reaction time, the operational voltage level of the fast control means relative to the same voltage level of the slow control means being so set that the fast control means becomes electrically conductive for the purpose aforesaid in response to a voltage surge in the energizing circuit excessive for the slow but more sensitive control means, thereby opening the energizing circuit before the more sensitive control means is damaged by an excessive voltage.

2. A protective network for protecting an electric device sensitive to voltage surges in an energizing circuit for the device, the said network comprising electromagnetic switch means including normally closed cut-off switch contacts in said energizing circuit and coil means controlling the opening of said switch contacts, auxiliary circuit means connected to said energizing circuit in parallel with the device to be protected, the said auxiliary circuit means including said coil means and flow discharge means and rectifying means, the latter two means being connected in parallel with each other and in series with the coil means, the said glow discharge means being less sensitive to changes in voltage than the rectifying means and having a faster reaction time than said rectifying means, both the glow discharge means and the rectifying means substantially blocking a flow of current through the auxiliary coil means sufficient to actuate the said coil means for opening the switch contacts when the voltage in the energizing circuit is below a predetermined level and becoming electrically conductive for actuating the coil means for the purpose aforesaid in response to a voltage above the predetermined level, the voltage breakdown characteristic of the glow discharge means being set above the operational voltage level of the rectifying means so that the glow discharge means becomes electrically conductive for the purpose aforesaid in response to a voltage surge in the energizing circuit excessive for the device to be protected and for the rectifying means, thereby opening the energizing circuit before the rectifying means is damaged by an excessive voltage.

3. A protective network for protecting an electric device sensitive to A.-C. and D.-C. voltage surges in an energizing circuit for the device, the said device comprising electromagnetic switch means including normally closed cut-off switch contacts in said energizing circuit and coil means controlling the opening of said switch contacts, auxiliary circuit means connected to said energizing circuit in parallel with the device to be protected, the said auxiliary circuit means including said coil means and glow discharge means, rectifying means and capacitance means, the said latter three means being connected in parallel with each other and in series with the coil means, the said glow discharge means being less sensitive to changes in voltage than the rectifying means and having a faster reaction time than said rectifying means, both the glow discharge means and the rectifying means substantially blocking a flow of current through the auxiliary coil means sufficient to actuate the coil means for opening the said switch contacts when the voltage in the energizing circuit is below a predetermined level and becoming electrically conductive for actuating the coil means for the purpose aforesaid in response to a voltage above said predetermined level, the said capacitance means blocking a flow of direct current through the auxiliary circuit means and a flow of an alternating current when the A.-C. voltage in the energizing circuit is below a predetermined level and becoming electrically conductive for actuating the coil means for the purpose aforesaid in response to an A.-C. voltage above the said predetermined level, the voltage breakdown characteristic of the glow discharge means, the operational voltage level of the rectifying means and the operational voltage level of the capacitance means respectively relative to each other being so that either the glow discharge means or the capacitance means becomes electrically conductive for the purpose aforesaid in response to a voltage surge in the energizing circuit excessive for the device to be protected and the rectifying means, thereby opening the energizing circuit before the rectifying means is damaged by an excessive voltage.

4. A protective network according to claim 3, wherein the said rectifying means comprise a pair of dry rectifiers connected parallel with each other in opposition.

5. A protective network according to claim 3 for protecting an electric device sensitive to voltage and current surges in an energizing circuit for the device in combination with a second coil means for said electromagnetic switch means, and electric control means connected in series in said energizing circuit and in parallel with said second coil means, the said latter control means having an impedance relative to the impedance of the second coil means sufficiently low to prevent a flow of current through the second coil means causing opening of the switch contacts when the flow of current through the energizing circuit is below a predetermined current level and an impedance sufficiently high to actuate the coil means for opening of the switch contacts when the flow of current through the energizing circuit exceeds the said predetermined current level.

6. A protective network according to claim 5, wherein the said second control means comprises two rectifying means connected in series opposition.

GEORGES FRIEDRICHS.

References Cited in the file of this patent
UNITED STATES PATENTS

| Number | Name | Date |
|---|---|---|
| 1,184,844 | Fortescue | May 30, 1916 |
| 1,189,409 | Van Alstyne | July 4, 1916 |
| 1,656,956 | Schroter | Jan. 24, 1928 |
| 1,686,905 | Engle et al. | Oct. 9, 1928 |
| 1,883,613 | Devol | Oct. 18, 1932 |
| 2,129,524 | Camilli | Sept. 6, 1938 |
| 2,181,539 | Wertz | Nov. 28, 1939 |
| 2,282,344 | Ruben | May 12, 1942 |
| 2,368,084 | Alexander | Jan. 30, 1945 |

FOREIGN PATENTS

| Number | Country | Date |
|---|---|---|
| 120,484 | Australia | Oct. 21, 1942 |
| 618,101 | Great Britain | Feb. 16, 1949 |

OTHER REFERENCES

Article, "Varistors," a group of articles reprinted from Bell Laboratories Record.